A. LARSEN.
AUTOMATIC WEIGHING MACHINE.
APPLICATION FILED JUNE 20, 1918.

1,384,263.

Patented July 12, 1921.
6 SHEETS—SHEET 1.

Inventor
Arnold Larsen.
By Hull, Smith, Brock & West
Attys.

A. LARSEN.
AUTOMATIC WEIGHING MACHINE.
APPLICATION FILED JUNE 20, 1918.

1,384,263.

Patented July 12, 1921.
6 SHEETS—SHEET 5.

Inventor
Arnold Larsen.
By Hull, Smith, Brock & West
Attys.

UNITED STATES PATENT OFFICE.

ARNOLD LARSEN, OF CLEVELAND, OHIO, ASSIGNOR TO THE WILLIAM GENT VENDING MACHINE COMPANY, OF CLEVELAND, OHIO, A CORPORATION OF OHIO.

AUTOMATIC WEIGHING-MACHINE.

1,384,263. Specification of Letters Patent. Patented July 12, 1921.

Continuation of application No. 876,423, filed December 10, 1914. This application filed June 20, 1918. Serial No. 240,923.

*To all whom it may concern:*

Be it known that I, ARNOLD LARSEN, a subject of the King of Norway, residing at Cleveland, in the county of Cuyahoga and State of Ohio, have invented a certain new and useful Improvement in Automatic Weighing-Machines, of which the following is a full, clear, and exact description, reference being had to the accompanying drawings.

This invention relates to automatic weighing machines of the class disclosed in my former application, Serial No. 876,423, filed December 10, 1914, the present case being a continuation of the former application and covering a phase of the invention apart from that covered by my former case.

The object of the present invention is to provide a thoroughly reliable and accurate weighing machine which is of a type wherein a weight or weights is or are shiftable along the scale beam to balancing position to indicate the weight of a load upon the platform or load supporting member.

The point of distinction between the machine disclosed in this application and that which constitutes the subject of my former application is the omission from the present machine of a coin controlled means for actuating the weights. In the present machine a load may be placed upon the platform or load supporting member and the machine will immediately start to operate and continue to do so until the weight or weights has or have assumed balancing position, there to be retained as long as the load remains upon the platform, the weight or weights automatically returning to normal position when the load is removed.

The present embodiment is therefore suitable to a more general use than the coin controlled embodiment.

In the drawings, wherein similar reference characters designate corresponding parts throughout the several views, Fig. 12 is a section on line 12—12 of Fig. 3.

Much of the machine or scales shown herein is that of a well known make and comprises a substantially rectangular base frame 1, from an extension 2 of which rises a hollow column or pedestal 3 that is surmounted by a shell 4 which supports a plate 5. The scale beam 6 is pivoted between the branches of a bifurcated bracket 7 which rises from the plate 5, and the beam has connection on one side of its pivot point, through the link 8, with the free end of a lever 9 that is fastened, at 10, within a clevis 11, supported by a hook 12 which depends from the underneath side of the plate 5. Intermediate its ends, and at a point substantially central of the column or pedestal 3, the lever 9 has pivotally connected to it a rod 15 which extends downward through the column or pedestal, and terminates, at its lower end, in a hook 16 which hangs within the extension 2 of the base frame.

Figure 7:
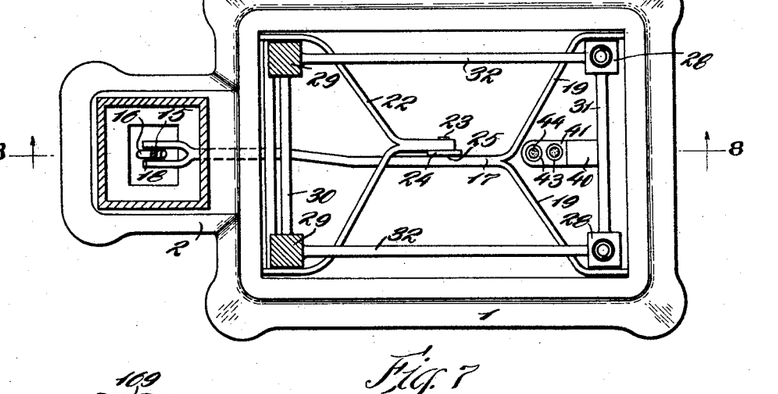
Fig. 7 is a horizontal section through the machine, between the base and platform, as indicated by the line 7—7 of Fig. 8.

The free end of a lever 17 has a "knife-edge" bearing within the hook 16, as shown at 18, and the opposite end of the lever is forked, as shown at 19, and each branch of the fork has similar pivotal connection with a clevis 20 which hangs from the upper edge of the base frame, as shown in Fig. 7. Clevises 21 hang from the opposite end of the base frame and support the separated ends of the yoke 22. This yoke extends to about the center of the base frame where it is provided with a knife-edge bearing 23 that is supported within a ring 24 which hangs from a bearing 25 of the lever 17. It will be observed from Fig. 7 that the ends of the branches of the forked end 19 of the lever 17, and the ends of the branches of the yoke 22, are parallel, and are provided with upwardly disposed knife-edge bearings, those of the lever 17 being shown at 26, and those of the yoke 22, at 27.

I substitute for the ordinary platform which has heretofore been supported upon the bearings 26 and 27, a skeleton frame comprising corner posts 28 and 29, for coöperation with the respective bearings 26 and 27. The posts 29 are connected by a transverse bar 30 and the posts 28 by a similar bar 31, while the posts 28 and 29 on each side of the frame are connected by parallel rails 32.

The platform or load support, designated 34, has depending ears 35 which are pivoted to the upper ends of the posts 29, and the opposite end of the platform rests, normally, upon compression springs 36 which are contained within sockets in the corner posts 28, the upward movement of the platform, with respect to said posts, being limited by the engagement of a lug 38, carried by the platform, with a stop 39 that extends laterally from the upper end of one of the posts 28. Secured to an extension 40 of the transverse bar 31 of the skeleton frame, is a block of insulating material 41, which carries a pair of binding posts 42, each having a cupped head 43, for the reception of a carbon contact block 44, for coöperation with a contact disk 45, carried by a pin 46 which depends from a block of insulating material 47 that is secured to the platform 34. This electric contact device will be referred to, hereinafter, as the platform switch.

The scale beam 6 comprises an upper and a lower branch 50 and 51, respectively, that are connected at their forward or "heavy" ends, by a portion 52, which extends through a loop or yoke 53, of a bracket 54, which rises from one end of the plate 5. At its opposite end, the branch 51 is connected to a portion 55 of the beam, adjacent its pivot point, and the corresponding end of the upper branch 50 is also secured to the portion 55 beyond the pivot point. The lower branch 51 is divided into "fifty-pound" graduations or divisions and carries what will be referred to as the "heavy" weight 56. To insure easy movement of the "heavy" weight along its branch 51, I provide the weight with rollers 57 which traverse the upper edge of the beam. A smaller weight 60, referred to hereinafter as the "light" weight, is slidable upon the branch 50 of the scale beam. This branch of the beam, it will be noticed, is divided into "one-pound" graduations, up to fifty pounds, so that when the "light" weight is at the extreme outer or "heavy" end of the branch 50, it will have the same effect as when the "heavy" weight reposes at the "fifty-pound" graduation upon the branch 51.

Figures 3, 13:
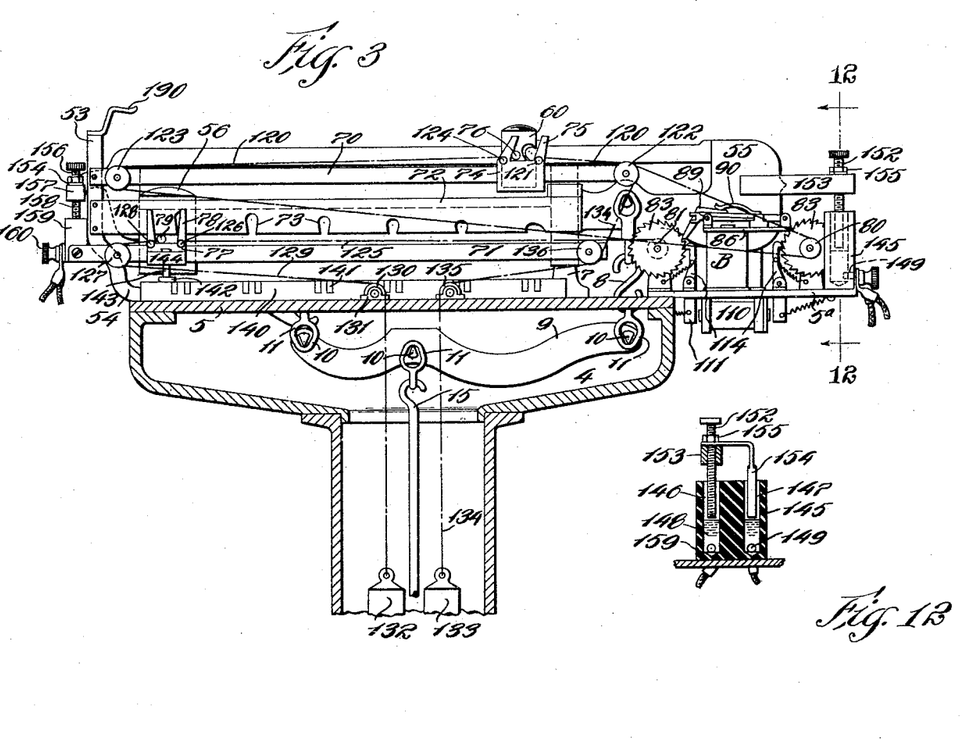
Fig. 3 is a rear elevation of what is shown in Fig. 2, a part of the head and pedestal being broken away to reveal the inclosed mechanism.
Fig. 13 is a diagram of the electric circuits involved in the machine.

Particularly from Fig. 3, it will be seen that a pair of stationary rails 70 and 71 extend alongside the scale beam and are supported at their ends from the previously mentioned brackets 7 and 54. Intermediate these rails and supported in the same manner, is a plate 72, having downwardly opening notches 73, which correspond in number and spacing with the graduations upon the lower branch of the scale beam. Movable along the rail 70 is a slide 74, from the upper edge of which rise the projections 75, said projections being spaced apart to receive between them a pin 76 which extends from the rear side of the "light" weight 60. A similar slide 77 is movable along the lower rail 71 and is provided with upwardly extending projections 78, between which reposes a roller 79 that is carried by the "heavy" weight 56. From the description thus far it will be seen that when either of the slides 74 or 77 is moved along its respective rail, the weight on the adjacent branch of the scale beam will be slid thereby by reason of the engagement of one of the projections of the slide with either the pin or the roller carried by the respective weight.

Figure 9:
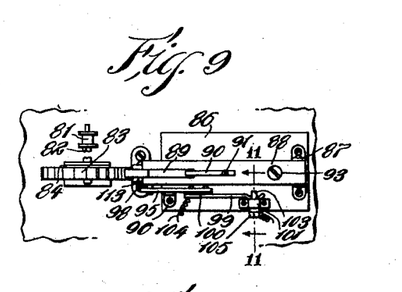
Figs. 9 and 10 are a plan and side elevation, respectively, of the mechanism or motor whereby one of the balancing weights is moved.
Figures 10, 11:
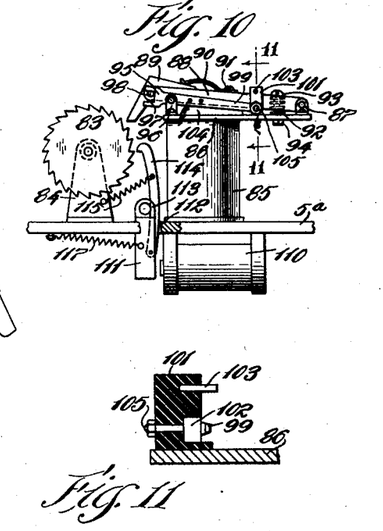
Fig. 11 is a sectional detail on the lines 11—11 of Figs. 9 and 10, the same being on a somewhat enlarged scale.
Figure 13:
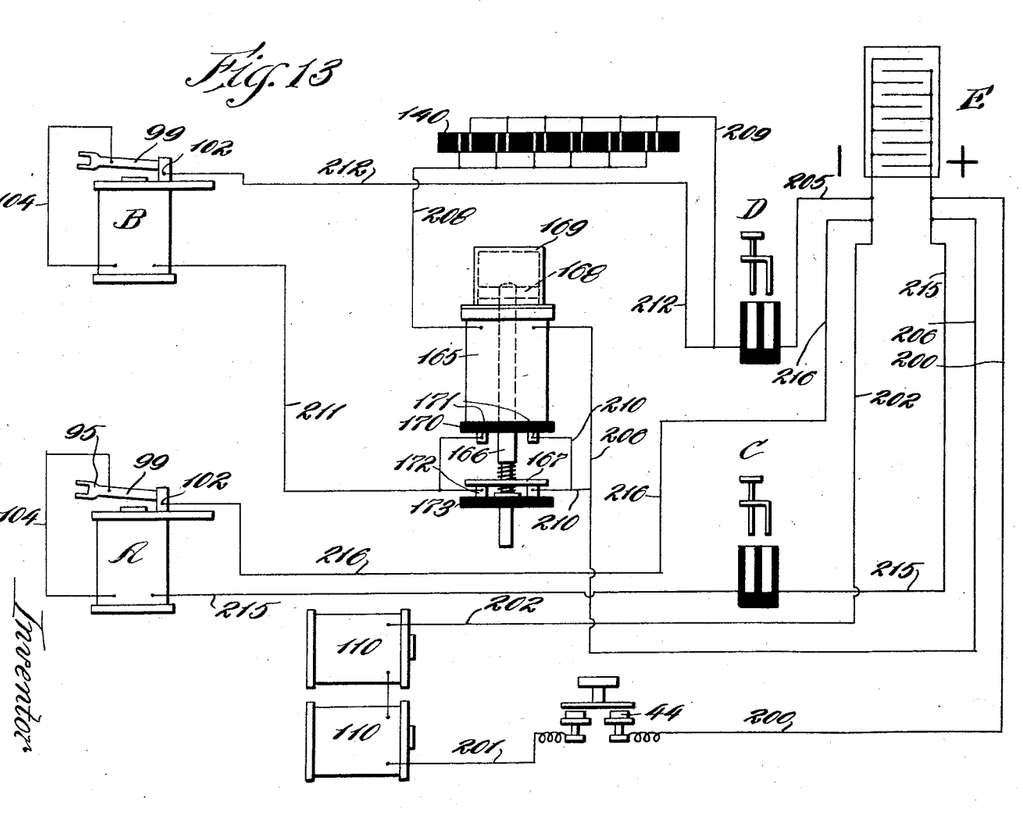

In Figs. 9, 10 and 11, I have shown a form of motor for moving the slides, and, through them, the weights, as above explained. These motors are supported upon an extension 5$^a$ of the plate 5. The motors are identical, and a description of one will suffice for both. As a matter of distinction between the two motors, I will employ the reference numeral 80 to designate the drum of the motor which operates the slide 74, and through it the weight 60, and I will use reference numeral 81 to designate the drum of that motor which is operatively connected through the slide 77 to the "heavy" weight. The drum (80 or 81) is fixed upon a shaft 82 which has secured to it a ratchet wheel 83, said shaft being supported in suitable brackets 84 from the plate 5$^a$. An electromagnet 85 is mounted with its core vertically disposed, upon the plate 5$^a$, alongside the ratchet 83 and the upper end of the magnet spool is formed by a plate 86 which extends laterally from one side of the magnet in a direction opposite the wheel 83. Pivoted between the ears 87, which rise from the projecting end of plate 86, is the rear end of what I will refer to as an armature beam 88, said beam being bifurcated at its forward end to receive an L-shaped pawl 89 that is pivoted between the branches of said bifurcated end. The nose of the pawl extends into close proximity to the teeth of the ratchet wheel 83, while the opposite end or tail of the pawl is acted upon by a spring 90, secured by the screws 91 to the armature beam 88. Near its end the underneath side of the armature beam is provided with a recess for the reception of a spring 92, the lower end of which bears upon the plate 86. By this means, the beam is elevated to what will be considered its normal position. A bolt 93 passes downward through the beam and the spring and has a nut 94 applied to its lower end, the same answering to retain the spring in place and also as a stop to prevent undue upward movement of the beam.

From the above description of the motor it will be seen that, when the magnet 85 is energized, the armature beam 88 will be drawn downward to project the nose of the pawl into contact with the teeth of the ratchet wheel 83 and to move said wheel a distance of one tooth. In order to effect a substantially continuous rotation of the wheel 83, therefore, it will be necessary to include means for intermittently interrupting the flow of current to the magnet in order to cause a vibration of the armature beam. Such an interrupter is provided by the lever 95 which is pivoted, near its forward end, to an ear 96 which rises from the plate 5ª. The forward end of the lever is forked, as shown at 97, and the pin 98, whereon the pawl 89 is pivoted, extends beyond the side of the armature beam 88 and between the branches of the fork 97. A contact spring 99 forms the rear end of the lever 95 and this is connected to and insulated from the pivoted end of the lever, as shown at 100. The free end of the spring contact 99 rubs along the inner surface of a block of insulating material 101, and is arranged to engage a stationary contact point 102, when in its lowest position. The movement of the contact spring in an upward direction is limited by the stop 103. By means of a wire 104, one end of the magnet coil is electrically connected to the contact spring 99; and the contact point 102 is formed with a binding post 105. One side of the circuit which includes the coil of the magnet 85 connects with said coil at its end opposite the wire 104 and the other side of the circuit connects with the binding post 105. Therefore, when the current is introduced into the electro-magnet, the armature beam 88 is attracted by the magnet and the nose of the pawl drawn downward into contact with the teeth of the ratchet wheel 83, the full depression of the armature effecting a movement of the wheel substantially equal to one of its teeth. At the same time, the pin 98 will engage the lower branch of the fork 97 and rock the rear end of the lever 95, or that end formed by the contact spring 99, upward away from the contact point 102, thereby breaking the circuit which includes the electro-magnet and resulting in the deenergization thereof. Immediately thereafter the armature beam is returned to normal position by the spring 92, and the pin 98, engaging the upper branch of the fork 97, swings the rear end of the lever 95 downward to bring the spring contact 99 again into engagement with the contact point 102 to reëstablish the circuit and again energize the magnet.

An electro-magnet 110 is suspended from the underneath side of the plate 5ª beneath each of the motors, and has an armature 111 which extends upward through a slot 112 in said plate, and has its upper end pivoted between ears 113 which rise from the plate. Within a cutaway portion of the armature is pivoted the lower end of a detent 114 that is drawn toward the ratchet wheel 83 by a spring 115, such spring having one of its ends connected to the detent and its opposite end connected to one of the brackets 84, wherein the shaft 82 is journaled. A spring 117, which has one of its ends attached to the plate 5ª, has its opposite end attached to the armature 111 and tends to draw the armature away from its magnet. It will be explained that the spring 117 is stronger than the spring 115, and that when the armature 111 is withdrawn from its magnet by the former spring, the upper end of the detent is withdrawn from the range of the teeth of wheel 83, the forward movement of the detent being limited by its engagement with a portion of the armature. However, when the magnet 110 is energized, and its armature 111 attracted toward it, the upper end of the detent 114 is drawn into engagement with the teeth of the ratchet wheel by the spring 115.

As shown clearly in Fig. 3, a strand 120 of suitable material, such as a fine piano wire, is attached, at 121, to the slide 74 and extends over a sheave 122 to the drum 80. After passing a few turns about the drum, it is extended over a sheave 123, located at the end of the rail 70 opposite the sheave 122, and has its opposed end attached to the slide 74, at 124. A strand 125, which has connection at 126 with the slide 77, passes about the drum 81 and thence over a sheave 127 to where its opposite end has connection, at 128, to the slide. A strand 129 is also connected to the slide 77 at 128 and, passing over the sheave 127, and the sheave 130 that is journaled between the ears 131 which rise from the plate 5, extends downward through an opening in the plate and carries, at its lower end, a weight 132, within the column 3. A similar weight 133 is suspended from the lower end of a strand 134 which passes upward through the column and through an opening in the plate 5, over a sheave 135 which is supported from said plate, and over a sheave 136 that is supported from the rail 71, to the sheave 122 and thence to where it has connection at 121 with the slide 74.

Figures 4, 5, 6:
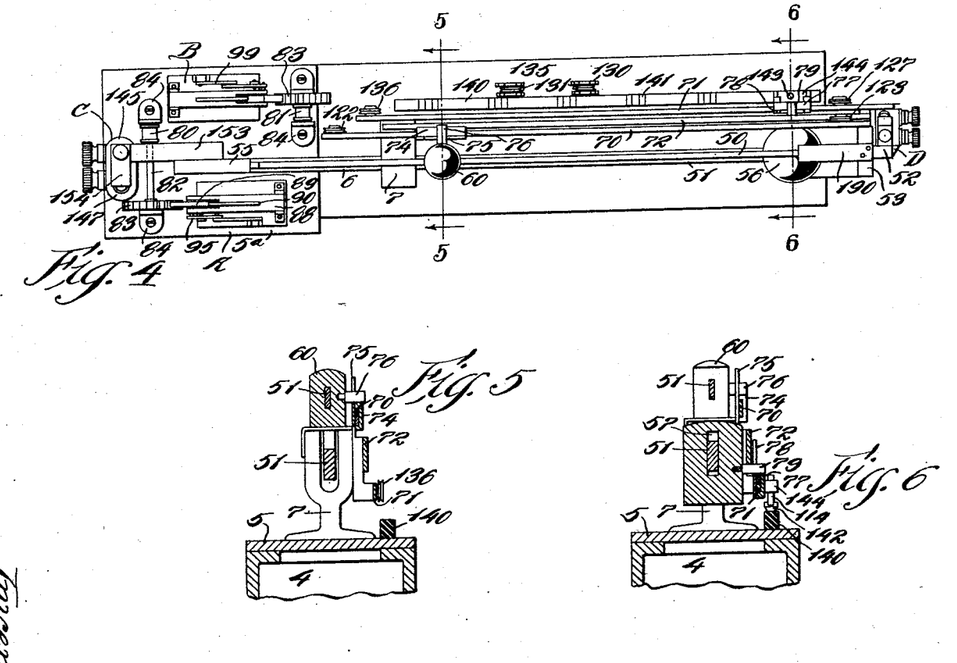
Fig. 4 is a plan view of the head of the machine with the casing removed.
Figs. 5 and 6 are transverse sections through the head of the machine, the respective views being taken on the correspondingly numbered lines of Fig. 4.

A strip 140 of insulating material extends along the plate 5, and is spaced to the rear of the rail 71, as clearly shown in Fig.

4. This strip is provided with a series of pairs of contact points or plates 141, said pairs corresponding in number and spacing to the notches 73 in the plate 72. A contact shoe 142 is slidable along the upper side of the strip and coöperates with the contact plates 141, said shoe being of sufficient length to bridge the contact plates of the respective pairs. The shoe 142 is swiveled to the lower end of a pin 143 that depends from a block of insulating material 144 that is carried by the slide 77.

Supported upon the outer end of the plate 5ª is a mercury switch comprising a body 145 of insulating material which is provided with a pair of wells 146 and 147, each of which contains a quantity of mercury 148 that is entered by a screw 149, threaded through the side of the cup and extending into said well. The outer ends of the screws constitute binding posts, as shown in Fig. 3. A screw 152 is threaded through the outer end of a block 153 of insulating material which is secured to the adjacent end of the scale beam, the lower end of such screw projecting downward into the well 146 of the block 145. A contact strip 154 extends downward into the well 147, and said strip is secured to the block 153, by having its end perforated for the passage of the screw 152 therethrough, the strip being held against the block 153 by a nut 155. It will be seen from the foregoing description that the two wells of the switch will be bridged upon the depression of the adjacent end of the scale beam. The opposite end of the scale beam is provided with contact members, similar to the ones just described, and consisting of a screw 156 that is threaded through a block of insulating material 157 carried by the scale beam, and a contact strip 158. A block of insulating material 159, having a pair of mercury wells, is secured to the side of the rail 71. These mercury wells are provided with binding posts 160 and 161.

Figure 8:
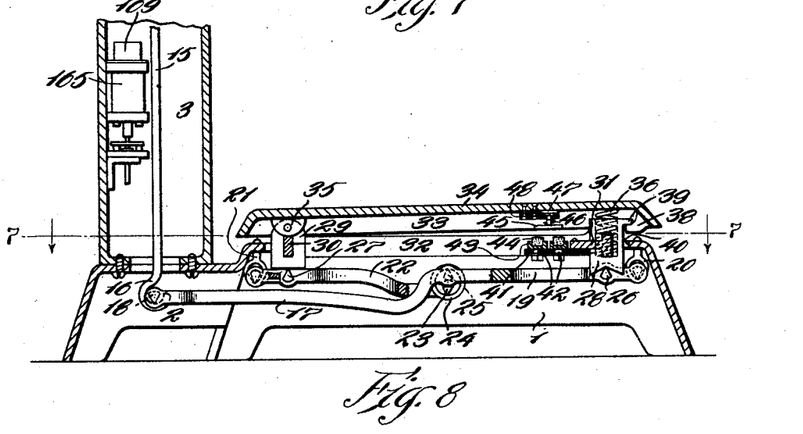
Fig. 8 is a vertical section through the lower portion of the machine, the same being taken substantially on the line 8—8 of Fig. 7.

In Fig. 13 there is shown a circuit breaker which comprises a solenoid 165, and, as will be seen from Fig. 8, it is located within the column 3 of the machine. The solenoid being in a vertical position, its core 166 will drop by gravity when its coil is deënergized. A contact plate 167 is yieldingly carried by the lower end of the core 166, and the opposite end of the core has connected to it the piston 168 of a dash pot 169, whereby the action of the solenoid is retarded. Extending from the head 170 of the solenoid are a pair of contact poins 171, and a pair of similar contact points 172 rise from a plate of insulating material 173 which is spaced from, and fixed with respect to, the head of the solenoid.

Figure 1:
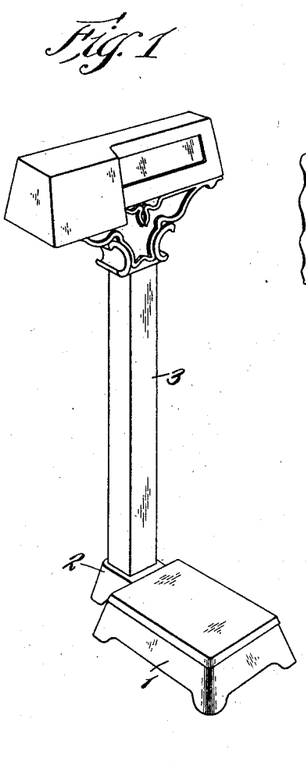
Figure 1 is a perspective view of the machine.
Figure 2:
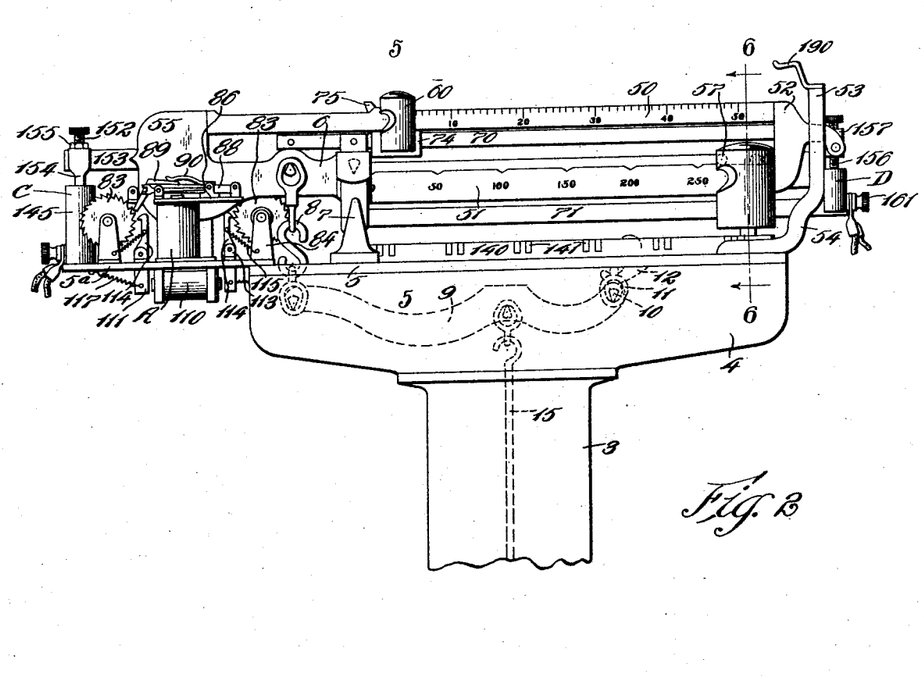
Fig. 2 is a front elevation of the head of the machine, the casing being removed.

Referring to Figs. 2, 3, and 4, attention is called to a cam plate 190 which extends from the top of bracket 154 upward and over the "heavy" end of the scale beam. This cam plate is in a position to be engaged by the upper end of the light weight 60 when the weight shall have traveled to the extreme outer or "heavy" end of its beam branch, and, because of its shape, the cam will effect a depression of said end of the beam, for a purpose which will become apparent farther along.

In the following description, the motor which is operatively connected to the "light" weight 60 will be referred to as motor A, and the one whereby the "heavy" weight 56 is moved, will be referred to as the motor B. And the mercury switch located adjacent the free or "heavy" end of the beam will be referred to as the switch D, while the other mercury switch or that supported upon the plate 5ª, will be referred to as switch C.

Referring now to the diagram which constitutes Fig. 13 a source of electric energy is represented by a battery E. A wire 200 leads from one side of the battery (the positive side, for instance) to one side of the platform switch, the same having connection with one of the binding posts 42 of a contact point 44, as shown in Fig. 8. The opposite side of the platform switch, or the other contact point 44 thereof, has connection with a wire 201 which leads to the electro-magnets 110; and a wire 202 extends from these electro-magnets back to the opposite (or negative side of the battery. Returning again to the first (or positive) side of the circuit, a wire 206 leads therefrom to the coil of solenoid 165, the opposite end of said coil having connection, through wire 208, with one of the contact plates 141 of each of the pairs supported by the strip of insulating material 140. The opposite plate of each pair has connection, through the wire 209, with one side of the switch D. The wire 206 connects, through a branched wire 210, with one of the contact points 171 and 172 of the circuit breaker, and the other contact points 171 and 172 have connection, through wire 211, with one end of the electro-magnet coil of the "heavy" weight motor B. Through the wire 104, the opposite end of the magnet coil has connection with the contact spring 99 of the interrupter, and the other element of the interrupter, or the contact point 102, has connection, through the wire 212 with the switch D. A third wire 215 leads from the positive side of the circuit, through the switch C, to the coil of the "light" weight motor A, the opposite side of said motor, or its respective contact point 102, having connection with the negative side of the circuit, through the wire 216.

The operation of the machine is as follows: A person stands upon the platform or load supporting member of the machine, or a load of some sort is placed thereon. Upon the depression of the platform 34, the contact points 44 of the platform switch are bridged by the plate 45, and a circuit is established through the wire 201, the electro-magnets 110, and the wire 202. By the energization of the electro-magnets 110, the detents 114 are moved into engagement with their respective ratchet wheels 83. It will be recalled that the "heavy" weight normally reposes at the free or "heavy" end of the scale beam, thereby holding it depressed, and the mercury switch D closed. As a result of this, a circuit is established through wires 206 and 210, contact points 172, plate 167, wire 211, the "heavy" weight motor B, wire 212, switch D, and wire 205. The coil of the motor B being thus energized, will effect operation of the motor to move the slide 77 along the rail 71, and the engagement of one of the branches 78 of said slide with the roller 79 of the "heavy" weight, will move said weight along its branch of the scale beam. As the contact shoe 142, which is carried by slide 77, bridges the first pair of contact plates 141, a circuit is established through the coil of the solenoid 165, wire 208, the aforesaid contact plates 141, wire 209, switch D, and wire 205. It will be explained that when the shoe 142 bridges a pair of contact plates 141, the roller 79 is directly beneath a corresponding notch 73 of the plate 72, and the "heavy" weight is adjacent one of the graduations of its scale beam branch. Upon energization of the solenoid coil, its core 166 will be drawn upward to remove the contact plate 167 from points 172, into contact with points 171. During this movement of the plate 167, which movement is retarded by the dash pot 169, current to the "heavy" weight motor is cut off and the operation of said motor is consequently suspended. Upon the bridging of contact points 171, however, said motor is again put into operation, to move the slide 77 farther along the rail 71, whereupon the shoe 142 is removed from one of the contact plates 141, to open the circuit through the solenoid coil. The solenoid thus being deënergized, permits its core to drop by gravity, and the plate 167 is again lowered upon contact points 172. Although the operation of the motor B is temporarily suspended during the downward travel of the plate 167, it will again be thrown into operation upon the arrival of the plate 167 into contact with points 172. The "heavy" weight continues to travel to its next graduation, when the operation will be temporarily suspended as aforesaid, with its roller 79 beneath the next notch 73. The movement of the "heavy" weight along its beam branch will continue until its roller 79 reposes beneath a notch 73 corresponding to a "fifty-pound" graduation which represents a weight equal to or less than that of the load (or person) upon the platform. The "heavy" weight will then be overbalanced and the free or "heavy" end of the scale beam will rise, such action being permitted by reason of the fact that the roller 79 of the "heavy" weight is in position to enter one of the notches 73. It will be assumed that the load upon the platform weighs something between that represented by the "fifty-pound" graduation at which the "heavy" weight is brought to rest, and the next graduation. In such an event, the free end of the scale beam rises high enough, not only to open the switch D by withdrawing the contact points comprising the screw 156 and the strip 158 from the wells of mercury, but sufficiently to cause its opposite end to move downward to project the contact points carried by it into the mercury wells of switch C. Said switch C having been closed, a circuit is established through wire 215, the "light" weight motor A, and wire 216, whereupon said motor will be actuated to move the slide 74 along the rail 70, and through the engagement of one of its projections 75 with pin 76 of the "light" weight 60, move said weight along its branch of the beam until it reaches a point where it balances the load upon the platform. When the "light" weight reaches balancing position the contact points will be withdrawn from the mercury wells of the switch C and the circuit last described will be broken. The motors A and B are therefore at rest. As long as the load remains upon the platform and the platform switch is closed, current will continue to flow through wires 200 and 201, electro-magnets 110, and wire 202, thereby retaining the magnets 110 energized to hold the detents in engagement with the ratchet wheels 83. In this way, the drums 80 and 81 of the respective motors are held against turning in a direction opposite to that in which they have been rotated by their respective motors. As soon as the load is removed from the platform and the platform switch opened, the circuit just mentioned will be broken and the electromagnets 110 deënergized, thereby releasing their respective ratchet wheels and the aforesaid drums, and the weights 132 and 133, which hang from strands 129 and 134 respectively, will move the respective balancing weights to their initial positions.

Having thus described my invention, what I claim is:—

1. In an automatic weighing machine, the combination of a load carrying member, a branched scale beam operatively connected thereto, a weight on each of the branches of said beam, said beam and load carrying member being normally overbalanced by said weights, means energized upon the depression of the load carrying member for automatically moving one of said weights along its beam branch until said weight is overbalanced by the load, means operating thereafter to automatically move the other weight along its branch to load balancing position, and means for thereafter returning both of said weights to initial position.

2. In an automatic weighing machine, the combination of a load carrying member, a branched scale beam operatively connected thereto, a weight movable along each of the branches, means including the load carrying member for automatically moving the heavy weight along its branch from the heavy toward the light end thereof and for arresting such movement at successive positions therealong, means for preventing the tilting of the beam except when the heavy weight is at one of such positions, mechanism for rendering such weight moving means inoperative when the said weight is overbalanced by the load, means operating automatically by the tilting of the scale beam for moving the lighter weight along its branch to load-balancing position, and means for automatically restoring the weights to initial position.

3. In an automatic weighing machine, the combination of a load carrying member, a graduated scale beam operatively connected thereto, a weight movable along said beam, means including the load carrying member for automatically moving the weight intermittently to successive graduations thereon and from the heavy toward the light end of the beam, mechanism for automatically rendering the weight moving means inoperative when said weight has been overbalanced by the load, and means preventing the tilting of the weight except when in register with a graduation of the beam.

4. In an automatic weighing machine, the combination of a load carrying member, a scale beam operatively connected thereto, a weight movable along said beam, means including the load carrying member for automatically moving the weight intermittently to successive positions along the beam, from the heavy toward the light end thereof, mechanism for automatically rendering the weight moving means inoperative when said weight has been overbalanced by the load, and means preventing the tilting of the weight except when at one of the aforesaid positions on said beam.

5. In an automatic weighing machine, the combination of a load carrying member, a branched scale beam operatively connected thereto, the branches of said beam being provided with graduations, a weight movable along each of said branches, means including the load carrying member and effected only when said member is moved in one direction under load for automatically moving the heavy weight along its branch from the heavy toward the light end thereof, and for arresting such movement at each graduation successively, mechanism for rendering such weight moving means inoperative when the said weight is overbalanced by the load, means operated automatically by the tilting of the scale beam for moving the light weight along its branch to load-balancing position, and means operative by the movement of the load carrying member in the reverse direction for automatically restoring the weights to initial position.

6. In an automatic weighing machine, the combination of a load carrying member, a branched scale beam operatively connected thereto, a weight movable along each of said branches, means including the load carrying member and effective only when said member is moved in one direction under load for automatically moving the heavy weight intermittently along its branch from the heavy toward the light end thereof, mechanism for rendering such moving means inoperative when the said weight is overbalanced by the load, means operating automatically by the tilting of the scale beam for moving the light weight along its branch to load-balancing position, and means operative by the movement of the load carrying member in the reverse direction for automatically restoring the weights to initial position.

7. In an automatic weighing machine, the combination of a load carrying member, a scale beam connected to the load carrying member and having weighing positions at intervals therealong, a weight movable along said beam, and means including said load carrying member for automatically moving the weight along the beam with a pause at each weighing position, the weight moving means being rendered inoperative upon movement of the beam.

8. In an automatic weighing machine, the combination of a load carrying member, a scale beam operatively connected thereto, a weight movable along said beam, and normally reposing at the heavy end thereof, means including the load carrying member and operative when said member is depressed for automatically moving the weight along the beam from normal to balancing position, mechanism for automatically rendering the weight moving means inoperative when said weight has been overbalanced by the load, and means rendered operative by the ascent of the load supporting member for returning the weight to normal position.

9. In an automatic weighing machine, the combination of a load carrying member, a scale beam operatively connected thereto, and having weighing positions spaced apart longitudinally of the beam, a weight movable along said beam, and means including the load carrying member and operative by a depression thereof for automatically moving the weight along the beam from the heavy to the light end thereof with a pause at each weighing position, the weight moving means becoming inoperative when said weight has been overbalanced by the load.

10. In an automatic weighing machine, the combination of a load carrying member, a branched scale beam operatively connected thereto, a weight movable along each branch of said beam, said beam and load carrying member being normally over-balanced by said weights, means energized upon the depression of the load carrying member for automatically moving one of said weights along its beam branch until overbalanced by the load, and means operative by the overbalancing of said branch for automatically moving the other weight along its branch to load-balancing position.

11. In an automatic weighing machine, the combination of a load carrying member, a branched scale beam operatively connected thereto, a weight movable along each branch of said beam, said beam and said load carrying member being normally overbalanced by said weights, means energized upon the depression of the load carrying member for automatically moving one of said weights along its beam branch until overbalanced by the load, means operative by the overbalancing of said branch for automatically moving the other weight along its branch to load-balancing position, and means for thereafter automatically returning both of said weights to initial position.

12. In an automatic weighing machine, the combination of a load carrying member, a branched scale beam operatively connected thereto, a weight on each of the branches of said beam, said beam and load carrying member being normally overbalanced by said weights, means energized upon the depression of the load carrying member for automatically moving one of said weights along its beam branch until said weight is overbalanced by the load, and means operating thereafter to automatically move the other weight along its branch to load-balancing position.

13. In an automatic weighing machine, the combination of a load carrying member, a branched scale beam operatively connected thereto, a weight movable along each branch of said beam, said beam and load carrying member being normally overbalanced by said weights, means energized upon the depression of the load carrying member for automatically moving one of said weights along its beam branch until overbalanced on said branch, and for automatically moving the other weight along its branch to load-balancing position.

In testimony whereof, I hereunto affix my signature.

ARNOLD LARSEN.